United States Patent [19]

Burgeson

[11] Patent Number: 5,220,741
[45] Date of Patent: Jun. 22, 1993

[54] TEMPERATURE REGULATED SCENT DISPENSER

[76] Inventor: John R. Burgeson, 4345 157th Ave. NW, Anoka, Minn. 55304

[21] Appl. No.: 788,820

[22] Filed: Nov. 7, 1991

Related U.S. Application Data

[63] Continuation of Ser. No. 200,582, May 31, 1988, abandoned.

[51] Int. Cl.$^5$ ............................................. A01M 31/00
[52] U.S. Cl. .......................................... 43/1; 222/181; 222/420
[58] Field of Search ...................... 43/1; 222/181, 184, 222/420; 119/72.5, 73

[56] References Cited

U.S. PATENT DOCUMENTS

| | | | |
|---|---|---|---|
| 3,589,338 | 6/1971 | Lovitz | 119/72.5 |
| 3,990,403 | 11/1976 | Jacobs | 119/72.5 |
| 4,667,430 | 5/1987 | Ziess, Jr. | 43/1 |
| 4,773,177 | 9/1988 | Gray, II et al. | 43/1 |
| 5,033,653 | 7/1991 | Kaufman | 222/185 |
| 5,060,411 | 10/1991 | Uhlman | 43/1 |

FOREIGN PATENT DOCUMENTS 2456472 1/1981 France ............................. 43/44.99

OTHER PUBLICATIONS

Weiss, John "The New Scrape Savvy", *Deer Hunting*, 1987, pp. 24, 56–59.
Advertisement, *White Tail Times*, "Hot Doe Scent System", Virginia Deer Hunters Assoc. Nov. 1987.

*Primary Examiner*—Richard K. Seidel
*Assistant Examiner*—Jeanne M. Elpel
*Attorney, Agent, or Firm*—Palmatier, Sjoquist & Helget

[57] ABSTRACT

The present invention concerns a device for use by hunters for the depositing of animal scent for the purpose of attracting game. The invention includes a rigid scent container releasably and sealably engagable with a temperature buffering scent reservoir. The present invention is suspendable above the ground whereby the scent reservoir depends below the scent container. The scent reservoir includes an attachment portion providing for the releasable and sealable engagement with the container, and a reservoir portion. The reservoir portion has an exterior surface defining an interior volume thereof. The scent reservoir also includes a conduit having a first end adjacent the attachment portion and secured thereto, and a second end terminating within the interior volume of the reservoir portion. The conduit provides for fluid communication of the liquid scent between the interior of the container and the scent reservoir portion. A scent releasing orifice extends through the surface of the reservoir portion above the second end of the conduit.

17 Claims, 1 Drawing Sheet

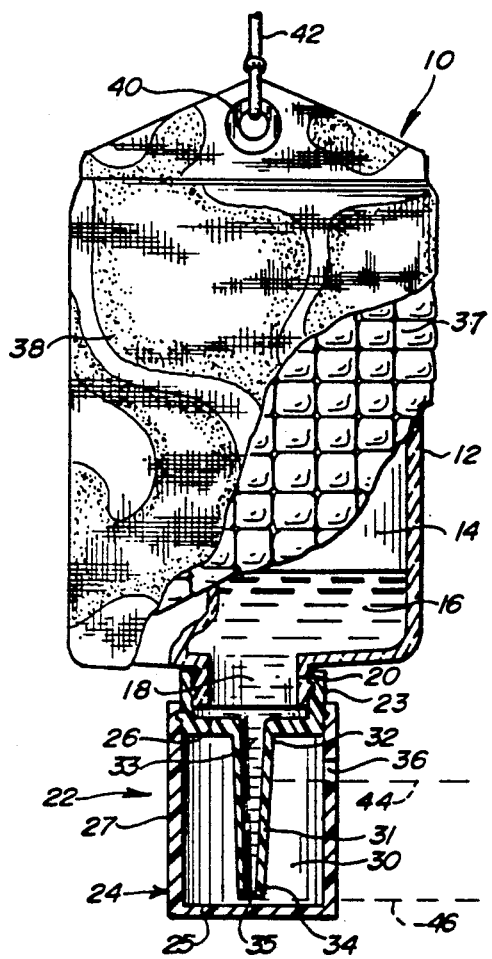
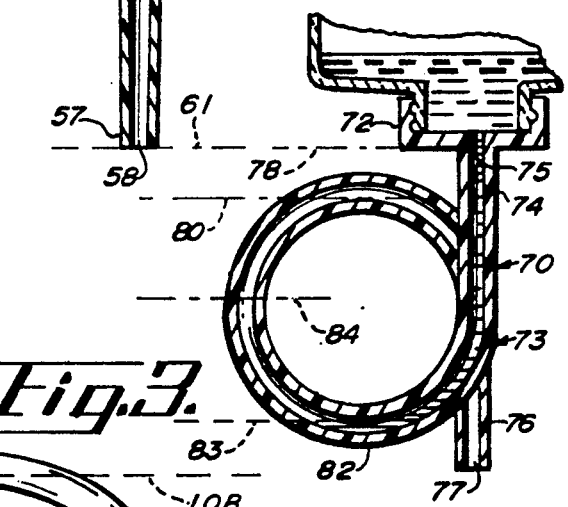
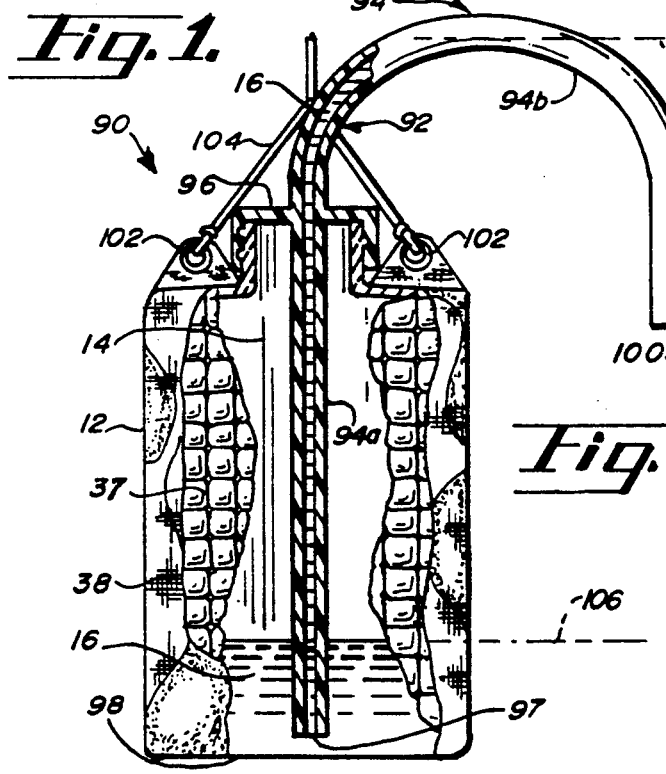

TEMPERATURE REGULATED SCENT DISPENSER

The present application is a continuation of application Ser. No. 07/200,582, filed May 31, 1988 now abandoned.

BACKGROUND OF THE INVENTION

1. Field of the Invention.

The present invention relates generally to devices used in hunting for the release of attractant scents, and more specifically to such devices designed to deposit scent at a particular location over a period of time.

2. Background.

The use of animal attractant scents by hunters to increase their chances of hunting success is well known. In particular, these scents can be used in ways that take advantage of the mating processes of certain species. For example, in the case of white-tail deer it is known that the buck will prepare a "scrape" to attract a doe. The scrape is prepared by the buck as he scrapes the ground with his hooves at a particular spot and deposits some urine thereon. This action can serve to attract a doe who will then periodically deposit a particular scent, produced when in heat, on the scrape, thereby indicating her receptiveness for mating. The buck will, in this manner, be alerted to the presence of the doe and will tend to spend more time in the location of his scrape. This increase in time spent in a particular area makes him easier to hunt. Thus, hunters will prepare an artificial scrape, or locate a natural scrape in attempts to attract a buck. This is done by finding a scrape, or preparing a mock scrape by scraping the ground in a manner similar to that of a buck, and then depositing a commercially available scent thereon that signals to the buck the presence of a doe in the correct stage of her estrous cycle.

Devices for depositing such scents are known, and generally consist of a bottle or other container for holding the scent and a valve for regulating the rate that the scent drips therefrom onto the scrape. Such devices are typically suspended from a branch above the scrape and provide for a continuous release of the scent. However, such a continuous flow is not generally desirable as attractant scents are relatively expensive, and release is not necessary during the night, or during periods of rain when the scent can be washed away. Continual opening and closing of the valve is not a good solution to this problem as scent deposition can take place over a number of days and would therefore be tedious, and also not desirable due to the greater possibility of leaving unwanted human odors around the scrape. Also, the valves of these devices, when set to provide for a very low flow rate, can become blocked and completely stop the flow of scent.

Other scent dispensing devices are known, that operate without the use of a valve mechanism, such as through the use of a siphoning action, and can provide for a slower flow of scent without clogging. However, the flow of scent from such devices is also continuous and there is no provision for reduction or elimination of flow when scent deposition is unwanted or not needed.

It would therefore be very desirable to have such a scent depositing device that could automatically regulate the flow of scent therefrom so as to minimize any waste of the scent and to increase the amount of time that the device could be left unattended.

SUMMARY OF THE INVENTION

The objects and advantages of the present invention include, but are not limited to, the following:

1. To provide for a scent releasing device that can self-regulate the flow of scent therefrom in response to environmental conditions so as to minimize the need for adjustment or other manipulation thereof.
2. To provide for such a self-regulating scent dispensing device that minimizes any unwanted stoppage of scent flow.
3. To conserve on the use of animal attractant scent.
4. To provide for such a self-regulating scent dispensing device that operates simply, and thus, reliably.
5. To slow down the deposition of scent during inclement weather.
6. To deposit scent only during daylight hours when hunting is taking place.

The present invention includes a rigid container, preferably a glass bottle having a scent containing body portion and having a narrowed neck end terminating in a single opening or orifice. A temperature buffering scent reservoir is releasably and sealably secured to the bottle orifice. The reservoir includes a conduit and a scent reservoir portion. The reservoir portion is a container having a base, a top and sidewalls extending therebetween that define the interior volume thereof. The conduit portion provides for fluid communication between the interior of the bottle and the interior of the reservoir. Specifically, one end thereof is releasably secured to the orifice of the bottle and extends therefrom into the interior of the reservoir portion. The other end of the conduit terminates within the interior of the reservoir portion adjacent the reservoir base. A scent release orifice is located adjacent the reservoir top in the sidewall thereof to provide for a dripping of the scent from the reservoir onto the scrape.

The body of the bottle is preferably covered with an insulating material which is in turn covered with a camouflaging material. The present invention includes suspension means, such as a string secured on one end to the camouflaging material, for suspending the present invention above an actual or artificially prepared scrape.

In operation, the scent reservoir is removed from the bottle orifice so that the scent can be placed into the bottle. For reasons that will become obvious later on herein, it is preferred that only approximately one-fourth of the bottle's volume be filled with scent. The bottle is then suspended above the scrape, generally from a tree branch, so that the reservoir hangs below the bottle and above the scrape.

The fact that the bottle is sealed will prevent the scent from flowing into the conduit and the reservoir portion when the bottle is inverted. for scent to fill the reservoir volume and ultimately exit through the scent releasing orifice an increase in temperature must occur causing the air in the bottle to expand thereby forcing the scent out of the bottle through the conduit and into the reservoir volume. Thus, the present invention takes advantage of the increase in temperature that normally occurs during daylight hours. Conversely, a reduction of temperature at night causes a contraction of the air in the bottle thereby removing the scent from the reservoir and, in fact, causing air to be sucked into the bottle. This added volume of air in the bottle provides for the delivery of more scent during the next daily heating cycle. It can now be appreciated that the present invention provides for an automatic daily replenishment of scent onto the scrape without the need for unwanted manipulation thereof by the hunter.

In addition, it can be seen that before any scent is dispensed through the scent releasing orifice located above the end of the conduit terminating within the reservoir portion, the reservoir volume must first be filled with scent up to that orifice level. Thus, a small increase in temperature not sufficient to fill the reservoir volume sufficiently will not result in scent being dropped onto the scrape. Therefore, the reservoir volume acts as a temperature buffer allowing the release of scent only when a sufficient temperature increase occurs. This buffering action serves to conserve on the amount of scent used by eliminating its deposition during small temperature fluctuations, and generally limiting dispersal during inclement weather which is often characterized by steady or falling temperatures. Such inclement weather can often be associated with the occurrence of rain during which release of scent is not desirable. It can now also be understood that approximately three fourths of the interior volume of the container must be air so as to allow enough expansion capacity to expel the desired amount of scent.

BRIEF DESCRIPTION OF THE DRAWINGS

A more thorough understanding of the operation of the present invention, and of its objects and advantages can be had in light of the following detailed description which refers to the following figures, wherein:

FIG. 1 shows a plan cross-sectional view of the present invention.

FIG. 2 shows a plan cross-sectional view of an alternative embodiment of the present invention.

FIG. 3 shows a plan cross-sectional view of a further alternative embodiment of the present invention.

FIG. 4 shows a plan cross-sectional view of a further alternative embodiment of the present invention.

DETAILED DESCRIPTION OF THE INVENTION

As seen in FIG. 1, the present invention is referred to generally by numeral 10 and includes a rigid container 12 such as a glass bottle. Container 12 defines an interior volume 14 for holding a liquid scent 16, and has a single opening 18 defined by a neck 20.

A temperature buffering scent reservoir, generally designated 22, includes a cap end portion 23 for providing threadable and sealable engagement with neck 20 of bottle 12. Scent reservoir 22 is preferably made of a plastic material resilient so as to provide for a tight sealing engagement between end portion 23 and bottle 12. Scent reservoir 22 further includes a reservoir portion 24 threadably engageable with cap portion 23, having a base 25, a top end 26 and a sidewall 27 extending therebetween. Base 25, end 26 and sidewall 27 serve to define the rigid exterior housing or surface of the interior volume 30 of reservoir portion 24. A scent delivery conduit 31 having an intake end 32 is integral with top end 26 and defines an intake orifice 33. End 32 extends from the center of top end 26 towards base 25 and terminates with an end 34 having an orifice 35 closely adjacent base 25. Conduit or tube 32 provides for fluid communication of scent 16 between container interior volume 14 and reservoir interior volume 30. A scent releasing orifice 36 extends through sidewall 27 at a point thereon adjacent top end 26.

Bottle 12 is preferably first covered with a thin insulating layer 37, such as a ¼ inch of a foam rubber material, which is in turn covered by a camouflaging material 38. Material 38 includes an eyelet 40 for providing for suspending of the present invention by a string or wire suspension suspending means 42.

The operation of the present invention can now be appreciated wherein, reservoir 22 is first removed from container 12 so that scent 16 can be poured into interior 14 thereof. After re-engaging reservoir 22 with container 12 scent dispensing device 10 is suspended above the ground whereupon scent is to be distributed. String 42, one end of which is secured to eyelet 40, provides for such suspension from a suitable object such as a tree limb whereby it can be understood that container 12 will be inverted so that reservoir 22 is below container 12 with respect to the ground. Scent 16 will then flow to and stop at end 32 of tube 31. This stoppage of flow is due primarily to the fact that interior volume 14 is sealed to prevent air from leaking into that interior volume and thereby allowing scent to be released.

It can now be appreciated that an increase in temperature will cause expansion of the air in container 12 resulting in scent 16 being forced into reservoir volume 30 through conduit 31. If the temperature increase is great enough scent 16 will fill reservoir volume 30 up to an above the level of orifice 36, such level being indicated by dashed line 44. Scent 16 can then exit through orifice 36 and drop onto the ground. Conversely, when the temperature cools in the evening, the air in container 12 will contract whereby scent 16 will be drawn out of reservoir volume 30 down to the level as indicated by dashed line 46. When volume 30 is lowered to level 46, air can the be sucked up tube 31 and into interior volume 14 of container 12. This added volume of air replaces the volume of scent 16 deposited and allows additional scent 16 to be released during the next heating cycle. It can be seen that container 12 must be rigid so as to resist any atmospheric pressure effects that can tend to distort the interior volume thereof and thereby detract from the proper operation of the present invention.

The present invention, thus, takes advantage of the relative change in temperature that generally occurs between day and night. It can also be appreciated that, after the first cycle of scent deposition, the size of the interior reservoir volume that must first be filled, before scent deposition can take place, is indicated by the volume thereof between dashed lines 44 and 46. This size therefore affects what degree of temperature increase, given a particular initial ratio of scent volume to container interior volume, is necessary to first cause such scent release. This reservoir volume, thus, acts as a temperature buffer to prevent the deposition of scent as the result of any small increase of temperature. In this manner small cycles in temperature change that can occur throughout the day will not trigger scent release. This situation is desirable as such frequent deposition can be unnecessary and wasteful. Also, if the temperature during the day does not increase more than 10 degrees Fahrenheit, this oftentimes indicates inclement weather, and specifically, the occurrence of rain, during which scent deposition is not particularly effective. It can also be understood that insulation layer 37, and to a certain extent camouflage material 38, serve to provide for temperature buffering so that the interior of container 12 is not as immediately affected by temperature fluctuations. The minimum degree change desired for initial scent deposition can vary with respect to regional hunting conditions and requirements. However, it has been found that for conditions as typically encountered in the northern United States, a 10 degree Fahrenheit increase requirement is desirable to provide for adequate scent release buffering. Given a container volume of approximately 150 ml, and a ratio of the volume of scent to the interior volume of the container of about 1 to 4, a temperature increase of 10 degrees Fahrenheit will result in approximately 2.5 ml of scent being expelled from the container into the reservoir. Thus, the reservoir volume would have to equal approximately 2.5 ml to provide for the desired buffering effect. Generally speaking, about 2 to 5 mls of scent should be deposited each day to refresh a scrape used to hunt white-tailed deer. Such volume of scent release will be accomplished in the above example if the daily increase in temperature is from 15 to 20 degrees Fahrenheit. Thus, the present invention can provide for unattended scent release, under average conditions as experienced by hunters in the northern United States, during a period of from 5 to 9 days. As reservoir portion 24 is threadably engagable with cap portion 23, it is contemplated that reservoirs of differing sizes can be used to accomodate various buffering volumes as may be dictated by particular hunting conditions.

It can be appreciated that, the ratio between the volume of scent and the volume of the container affects the amount of scent pushed from the container, whereby the larger the proportion of air within the container is to the volume of scent initially, the greater will be the amount of scent so released for a given temperature increase. The above stated 1 to 4 ratio allows for an adequate amount of air in the container to push out the desired amount of scent under the above described conditions and parameters. However, it will be appreciated by those of skill, that changes of the ratio of the volume of scent to the interior volume of the container, and changes of the reservoir volume can be made to adapt the invention herein to differing hunting or climatic conditions or requirements. Thus, if greater temperature buffering is desired the reservoir volume could be increased and/or the volume of scent initially placed into the container could be increased with respect to the volume thereof, and conversely, if less temperature buffering is needed.

A further embodiment of the present invention is seen in FIG. 2, wherein the modification is represented by a temperature buffering scent reservoir generally designated 50. Reservoir 50 includes a cap end 52 for providing sealable and releasable engagement with container 12. Reservoir 50 also includes a tube portion 54 sealably attached to or integral with cap end 52. Portion 54 includes an intake end 55 defining an intake orifice 56 and extending therefrom to a release end 57 defining a scent release orifice 58. A temperature buffering volume 59 is defined as that portion of the interior volume of tube 54 extending between dashed lines 60 and 61.

In operation, as with the previous embodiment, after adding scent 16 to container 12, the present invention is suspended above the ground whereby scent dispensing reservoir 50 depends below container 12. Scent 16 will initially start at a level represented by dashed line 60. Thus, an increase in temperature will cause scent 16 to travel through orifice 56 down tube 54 towards orifice end 57. If the increase is sufficient scent can then be expelled out of orifice 58 for deposition onto the ground. Reduction of temperature will cause scent 16 to be pulled back into container 12 as the air therein contracts ultimately resulting in more air being sucked therein when scent 16 reaches level 60.

Tube portion 54 can be made of a flexible plastic material. Also, it is desirable that the inside diameter thereof be on the order of approximately ⅛th of an inch to help insure that the surface tension of the scent is sufficient to prevent air from bubbling up into container 12 as the result of the present invention being moved or shaken by the wind or other forces. For hunting under conditions as previously described, and given a container volume of approximately 150 ml, and tube 54 having an inside diameter of ⅛th inch, tube 54 should be approximately 12 inches in length to provide for suitable buffering and adequate scent release.

A further embodiment of the present invention is seen in FIG. 3, wherein the modification is represented by a temperature buffering scent reservoir generally designated 70. Reservoir 70 includes an attachment or cap portion 72 for providing sealable and releasable engagement with container 12. Reservoir 70 also includes a tube reservoir portion 73 having an intake end 74 defining an intake orifice 75. End 74 is secured to, or integral with cap portion 72 and extends therefrom to a scent releasing end 76 defining a scent release orifice 77. In contradistinction to the embodiment seen in FIG. 2, tube portion 74 is formed into a loop whereby it extends through an arc of 360 degrees.

In operation, as with the other described embodiments, after adding scent 16 to container 12, the present invention is suspended above the ground whereby scent dispensing reservoir 70 depends below container 12. Scent 16 will initially start at a level represented by dashed line 78. Thus, an increase in temperature will cause scent 16 to travel through orifice 75 into tube portion 73 towards end 76. If the increase is sufficient, scent can travel to the apex of the circular loop portion as such apex is indicated by dashed line 80 tangent thereto. It can be understood that scent 16 will then be able to flow down the remaining length of tube portion 73 and out of orifice 77 for ultimate deposition onto the ground. Tube portion 73 can be made of a flexible plastic material. Also, the inside diameter thereof can be somewhat greater than that of tube 54 of the embodiment in FIG. 2, as the formation of tube into a loop serves to further resist the accidental release of scent therefrom, as opposed to the FIG. 2 embodiment, other than by the action of the expansion of the air in container 12. This is due to the fact that once scent has been deposited and the cooling or contraction cycle has begun air will be sucked into container 12 whereby scent 16 will be drawn to the level indicated by dashed line 83. At this level air can be sucked into container 12 and, as a result thereof, scent 16 will not be drawn further into tube 73 in the direction of container 12. Therefore, a portion of scent 16 will always reside above the bottom most point of tube 73, such bottom point being indicated by numeral 82. Thus, air must oppose gravity to enter into container 12 once scent 16 is pulled beck to the level indicated by line 83. It can now be appreciated that the buffering volume of this embodiment is that portion of the interior volume of tube 73 between the levels indicated by dashed lines 80 and 83. The inside diameter of tube portion 73 can be on the order of approximately ¼th of an inch, and to achieve the desired buffering and volume of scent deposition under conditions as experienced in the northern United States, should be approximately 7 inches long. It can be appreciated that tube portion 73 need not travel through a full 360 degrees of arc to be effective to resist air entering into container 12, as for example tube portion 73 could, if suitable changes were made to the length and, or interior volume thereof, be formed into a j-shape by being cut off at the level as indicated by dashed line 84.

A further embodiment of the present invention is seen in FIG. 4, and generally designated 90. Embodiment 90 is designed to be suspended in a manner inverse to that of the previously described embodiments wherein the temperature buffering scent reservoir 92 is held above container 12 with respect to the ground. Reservoir 92 includes tube reservoir portion 94 and a cap portion 96. Cap 96 is sealably and releasably secured to container 12. Tube portion 94 extends through cap 96 and is sealably engaged or integral therewith. Interior tube section 94a of tube portion 94 extends into the interior volume 14 of container 12 and terminates therein with a scent intake orifice 97 closely adjacent the bottom end 98 of container 12. Exterior tube section 94b extends exterior of container 12 and terminates with a scent release orifice 100.

Embodiment 90 also includes a pair of eyelets 102 and string or wire suspension means 104, for providing suspension thereof above the ground.

In operation, scent 16 is added into container 12, reservoir 92 is sealably engaged with container 12, after which dispenser 90 is suspended above the ground by suspension means 104. As opposed to the previously described embodiments, temperature buffering reservoir 92 will, with the exception of interior tube section 94a, be oriented above container 12 with respect to the ground. Initially scent 16 will be at the level within tube section 94a as indicated by dashed line 106. Dispenser 90 operates in the same manner as described herein with the previous embodiments of the present invention. Specifically, an increase in temperature will cause an expansion of the air within volume 14 resulting in scent 16 being pushed into orifice 97, through tube portion 94 and ultimately out of orifice 100, after which it can then drip onto the ground. Interior tube section 94a is needed to reach scent 16 which, due to the orientation of this embodiment, will reside at the bottom 98, of container 12. As with the other embodiments, a decrease in temperature will contract the air in container 12 causing scent 16 to be pulled back therein, and can result in additional air being brought into container 12 to replace the volume of scent 16 dispensed. In operation scent 16 will flow out of tube 94 when it reaches the apex or high point of the arcuate exterior portion 94a, as is indicated by the dashed line 108 tangent to that apical point. Thus, for the first cycling it can be seen that the reservoir buffering volume is represented by the volume of tube portion 94 between dashed lines 106 and 108. However after the first deposition of scent and contraction, the exterior air drawn in will be held at the level of orifice 97. Therefore, the effective reservoir volume for subsequent depositions will be the interior volume of tube 94 between orifice 97 and level 108. Furthermore, tube portion 94 is j-shaped whereby orifice 100 is held somewhat away from bottle 12 so that scent 16 can be cleanly dispensed onto the ground without contacting container 12.

It will be appreciated by those of skill in the art that a wide variety of modifications to the present invention with respect to, for example, reservoir and container shapes and dimensions, and with respect to the orientation thereof to each other and to the ground, can be made without departing from the spirit or scope of the essential attributes thereof. Therefore, it is desired that the disclosed embodiments be considered in all respects as illustrative and not restrictive, reference being made to the appended claims rather to the foregoing description to indicate the scope of the invention.

What is claimed is:

1. A temperature regulated scent dispensing device, for suspension above a ground surface, comprising: a container having an interior volume holding a volume of a scent and a volume of air, the container having a single opening to the container interior volume on a first container end opposite from a container second end and the container second end having suspension means for suspending the container from a support structure above the ground surface wherein the container opening is oriented below the container second end when the container is so suspended above the ground surface, a secondary scent reservoir, the secondary reservoir comprising a length of tubing, the tubing having a first end and a second end and the tube having a temperature buffering interior volume between the ends thereof, and the tube first end sealably securable to the container in an airtight manner and the tube second end having a scent release orifice wherein the only path of fluid communication into the container interior volume when the tube first end is sealably secured to the container opening is through the tube between the attachment end and the scent release orifice and through the buffering volume thereof, and the container made of a rigid material so as to resist any atmospheric pressure effects that may distort the interior volume thereof so that heating of the air in the container results in expansion of the air wherein the expanding air results in the forcing of the scent first into and filling the reservoir volume of the tube and ultimately out of the release orifice so that scent is dispensed on the ground surface only after a predetermined amount of heating has occurred above an initial ambient condition, and the tube curved through an arc of substantially 180 degrees and forming a J-shape for providing increased resistance to accidental release of scent from the scent release orifice of the tube second end wherein the scent release orifice is positioned above a portion of the tube.

2. The scent dispensing device as defined in claim 1, and further including, insulating material surrounding the container for moderating the heating of the air within the container as caused by the surrounding environment.

3. The scent dispensing device as defined in claim 2, and further including, camouflaging material surrounding the insulation material.

4. The scent dispensing device as defined in claim 1, and further including, camouflaging material surrounding and secured to the exterior of the container.

5. A temperature regulated scent dispensing device, for suspension above a ground surface, comprising: a container having an interior volume holding a volume of a scent and a volume of air, the container having a single opening to the container interior volume on a first container end opposite from a container second end and the container second end having suspension means for suspending the container from a support structure above the ground surface wherein the container opening is oriented below the container second end when the container is so suspended above the ground surface, a secondary scent reservoir, the secondary reservoir comprising a length of tubing, the tubing having a first end and a second end and the tube having a temperature buffering interior volume between the ends thereof, and the tube first end sealably securable to the container in an air-tight manner and the tube second end having a scent release orifice wherein the only path of fluid communication into the container interior volume when the tube first end is sealably secured to the container opening is through the tube between the attachment end and the scent release orifice and through the buffering volume thereof, and the container made of a rigid material so as to resist any atmospheric effects that may distort the interior volume thereof so that heating of the air in the container results in expansion of the air wherein the expanding air results in the forcing of the scent first into and filling the reservoir volume of the tube and ultimately out of the release orifice so that scent is dispensed on the ground surface only after a predetermined amount of heating has occurred above an initial ambient condition, and the tube curved through an arc of substantially 360 degrees wherein the scent release orifice is positioned below substantially all of the length of the tube.

6. The scent dispensing device as defined in claim 5, and further including, insulating material surrounding the container for moderating the heating of the air within the container as caused by the surrounding environment.

7. The scent dispensing device as defined in claim 6, and further including, camouflaging material surrounding the insulation material.

8. The scent dispensing device as defined in claim 5, and further including, camouflaging material surrounding and secured to the exterior of the container.

9. The scent dispensing device as defined in claim 5, and further including, camouflaging material surrounding the insulation material.

10. A temperature regulated scent dispensing device, for suspension above a ground surface, comprising: a container having an interior volume holding a volume of a scent and a volume of air, the container having a single opening to the container interior volume on a first container end opposite from a container second end and the container first end having suspension means for suspending the container from a support structure above the ground surface wherein the container opening is oriented above the container second end when the container is so suspended above the ground surface, a secondary scent reservoir, the secondary scent reservoir comprising a tube, the tube having a first end and a second end, and a temperature buffering interior volume there between, the tube extending through the container opening and having a first portion thereof held within the container volume wherein the tube first end is positioned adjacent the container second end and the tube having a second portion extending exterior of the container, and the tube sealed in an air-tight manner with the container opening, and the tube second end having a scent release orifice, and the container made of a rigid material so as to resist any atmospheric pressure effects that may distort the interior volume thereof so that heating of the air in the container results in expansion of the air wherein the expanding air results in the forcing of the scent first into and filling the reservoir volume and ultimately out of the release orifice so that scent is dispensed on the ground surface only after a predetermined amount of heating has occurred above an initial ambient condition, and the tube curved through an arc for providing increased resistance to accidental release of scent from the scent release orifice of the tube second end and for facilitating dispensing of scent directly on the ground surface, and wherein the scent release orifice is positioned above an initial top surface of the scent held within the container when the container is suspended above the ground surface.

11. The scent dispensing device as defined in claim 10, and the tube curved through an arc of substantially 180 degrees forming a U-shape.

12. The scent dispensing device as defined in claim 10, and further including, insulating material surrounding the container for moderating the heating of the air within the container as caused by the surrounding environment.

13. The scent dispensing device as defined in claim 12, and further including, camouflaging material surrounding the insulation material.

14. The scent dispensing device as defined in claim 10, and further including, camouflaging material surrounding and secured to the exterior of the container.

15. A temperature regulated scent dispensing device, for suspension above a ground surface, comprising: a container having an interior volume holding a volume of a scent and a volume of air, the container having a single opening to the container interior volume on a first container end opposite from a container second end and the container second end having suspension means for suspending the container from a support structure above the ground surface wherein the container opening is oriented below the container second end when the container is so suspended above the ground surface, a secondary scent reservoir, the secondary scent reservoir having an outer housing having a bottom end and a sidewall integral therewith and extending upward therefrom to a top sidewall perimeter edge, the perimeter edge sealably secured in an air-tight manner around a perimeter of the container opening so that the housing when so secured defines a housing interior volume, and a tube having a first end in sealed fluid communication with the container opening and extending within the housing volume to a tube second end positioned adjacent the housing bottom end, and the sidewall having a scent release orifice there through at a position along the sidewall above the tube second end so that a temperature buffering volume portion of the housing interior is defined substantially between the housing bottom end and the release orifice, and the container made of a rigid material so as to resist any atmospheric pressure effects that may distort the interior volume thereof so that heating of the air in the container results in expansion of the air wherein the expanding air results in the forcing of the scent first into and filling the tube then into and filling the temperature buffering volume portion of the housing interior and ultimately out of the release orifice so that scent is dispensed on the ground surface only after a predetermined amount of heating has occurred above an initial ambient condition.

16. The scent dispensing device as defined in claim 15, and further including, insulating material surrounding the container for moderating the heating of the air within the container as caused by the surrounding environment.

17. The scent dispensing device as defined in claim 15, and further including, camouflaging material surrounding and secured to the exterior of the container.

* * * * *